United States Patent

Wissmach et al.

[11] Patent Number: 5,821,661
[45] Date of Patent: Oct. 13, 1998

[54] ELECTROMOTOR

[75] Inventors: Walter Wissmach, Munich, Germany; Stefan Miescher, Eschen, Liechtenstein; Ferdinand Kristen, Germering; Ernst Klein, Lamerdingen, both of Germany

[73] Assignee: Hilti Aktiengesellschaft, Schaan, Liechtenstein

[21] Appl. No.: 868,197

[22] Filed: Jun. 3, 1997

[30] Foreign Application Priority Data

Jun. 3, 1996 [DE] Germany ................. 196 22 186.2

[51] Int. Cl.⁶ ............... H02K 3/34; H02K 3/32; H02K 1/17
[52] U.S. Cl. ......................... 310/194; 310/181
[58] Field of Search ................. 310/214, 215, 310/218, 194, 103, 181

[56] References Cited

U.S. PATENT DOCUMENTS

| | | | |
|---|---|---|---|
| 2,999,176 | 9/1961 | Lindstrom et al. | 310/215 |
| 3,609,427 | 9/1971 | Lautner et al. | 310/194 |
| 3,984,711 | 10/1976 | Kordik et al. | 310/181 |
| 4,816,710 | 3/1989 | Silvaggio et al. | 310/194 |
| 4,975,611 | 12/1990 | Rochester | 310/194 |
| 5,015,904 | 5/1991 | Kleemann | 310/184 |
| 5,331,246 | 7/1994 | Baronosky | 310/194 |
| 5,345,131 | 9/1994 | Torok | 310/181 |
| 5,444,318 | 8/1995 | Stumpf | 310/103 |

FOREIGN PATENT DOCUMENTS

| | | |
|---|---|---|
| 0564516 | 7/1992 | European Pat. Off. . |
| 0605247 | 7/1994 | European Pat. Off. . |
| 2126691 | 10/1972 | France . |
| 9111844 | 8/1991 | WIPO . |

OTHER PUBLICATIONS

European Search Report, Number EP 97 810 282.0 dated Sep. 24, 1997.

*Primary Examiner*—Clayton E. Laballe
*Attorney, Agent, or Firm*—Anderson, Kill & Olick, P.C.

[57] ABSTRACT

An electromotor including a stator (32) having a central receiving region for a rotor (23), at least two, projecting into the rotor-receiving region, stator pole pairs (18, 19, 20, 21), an insulation element (1, 2) provided at each end side of the stator (32), a stator winding (16, 17) surrounding a stator pole pair (18, 19, 20, 21) and a portion of a respective insulation element (1, 2), a permanent magnet (14, 15) between a pair of adjacent stator poles (18, 19, 20, 21), and dielectric support elements (7, 8) cooperating with respective insulation elements (1,2) and arranged along the main axis of the rotor-receiving region of the stator (32) between side surfaces (28, 29, 30, 31) of the stator poles (18, 19, 20, 21), which extend substantially parallel to the main axis of the rotor-receiving region of the stator (32) and to each other, and the stator windings (16, 17), respectively.

7 Claims, 2 Drawing Sheets

ELECTROMOTOR

BACKGROUND OF THE INVENTION

1. Field of the Invention

The present invention relates to an electromotor including a stator having a central region for receiving a rotor, at least four stator poles arranged in pairs and projecting into the central rotor-receiving region, a stator winding surrounding each pair of stator poles and a portion of a respective insulation element, and a permanent magnet arranged between stator poles of each pair.

2. Description of the Prior Art

There exist two methods of mounting the stator winding in the stator. According to one of the methods, the stator winding is manufactured outside of the stator and is then mounted on the stator poles in the stator. According to another method the stator winding is wound directly in a stator formed of a lamination bundle.

Electromotors, the stator winding of which has a substantially circular shape and is produced outside of the stator from a winding wire, cannot be economically manufactured because individual operational steps of this manufacturing process are very time-consuming and because the manufacture of winding machines necessary for forming the stator windings is very expensive.

Electromotors, in which the stator winding is formed directly in the stator of a winding wire, are provided, in the stator pole regions, with an undercut so that the winding wire would not slide off the stator pole. However, because of these undercuts, the stators are formed with increased dimensions and have, therefore, a large total weight.

This large total weight, in particular in electromotors, in which a permanent magnet is provided between two stator poles, becomes even more problematic because the permanent magnets likewise have a large weight themselves. Such an electromotor is disclosed, e.g., in European Patent No. 564,516.

Accordingly, an object of the invention is a low-weight electromotor the stator winding of which is formed directly in the stator from a winding wire, without the winding wire sliding off the stator poles.

Another object of the invention is a simple and cost-effective solution for securing of the permanent magnets.

SUMMARY OF THE INVENTION

These and other objects of the present invention, which will become apparent hereinafter, are achieved by providing an insulation element on each end side of the stator and by providing, between side surfaces of each stator pole pair, which extend parallel to the main axis of the rotor-receiving region of the stator and to each other, and the stator winding, a dielectric support element which cooperates with at least one of the insulation element.

Providing in an inventive electromotor an insulation element on each end side of the stator and providing, between side surfaces of each stator pole pair, which extent parallel to the main axis of the rotor-receiving region of the stator and to each other, and the stator winding, a dielectric support element, which cooperates with at least one of the insulation element, enables a mechanized placing of the winding wire into the stator, without the winding wire sliding off spaced side surfaces of the stator pole.

Advantageously, the support elements extend, at least partially, along an envelope formed by contact surfaces of the stator poles. At that, the support elements extend substantial transverse to the main axis of the rotor-receiving region of the stator and form a concave receiving region directed toward the main axis of the rotor-receiving region of the stator. The concave region, which is formed by the support elements, prevents sliding of the winding wire off the stator poles during mechanized placing of the winding wire into the stator.

A simple mounting and a good alignment of the support elements in the stator is advantageously achieved by forming the support elements and one the two insulation elements as a one-piece part.

Preferably, the support elements are formed of a plastic material which insures good insulation properties and a reduced weight.

According to a further development of the present invention, rapid and simple mounting of a permanent magnet in the stator is advantageously insured by providing on one of the insulation elements at least two projecting carriers for receiving respective permanent magnets. Upon mounting of the insulation elements on the end surfaces of the stator, the permanent magnets, which are supported by the carriers, are pushed into the stator and are positioned there.

In order to achieve a form-locking connection between the permanent magnets and the carriers, advantageously, each carrier is formed of two, extending parallel to each other, dielectric carrier elements arranged, respectively, between the side surfaces of a stator pole pair and the permanent magnets.

A pair of carrier elements may be connected, at their free ends, with a connection web. In this way, the permanent magnets, which are arranged between two carrier elements, are axially secured relative to the carrier elements.

Advantageously, the carrier elements are formed of a plastic material which insures good insulation properties and a reduced weight.

Each carrier, which serves for supporting and centering of a permanent magnet in the stator, can, e.g., be also formed of two chambers open at their free ends which extend parallel to the main axis of the rotor-receiving region of the stator end along a portion of the total length of the stator. Each of the chambers, which are arranged coaxially with each other, is provided in one of the carrier elements. In the mounted condition, the chambers at least partially receive the permanent magnets.

BRIEF DESCRIPTION OF THE DRAWINGS

The features and objects of the present invention will become more apparent, and the invention itself will be best understood from the following detailed description of the preferred embodiment when read with reference to the accompanying drawings, wherein.

DETAILED DESCRIPTION OF THE PREFERRED EMBODIMENT

Figure 1:
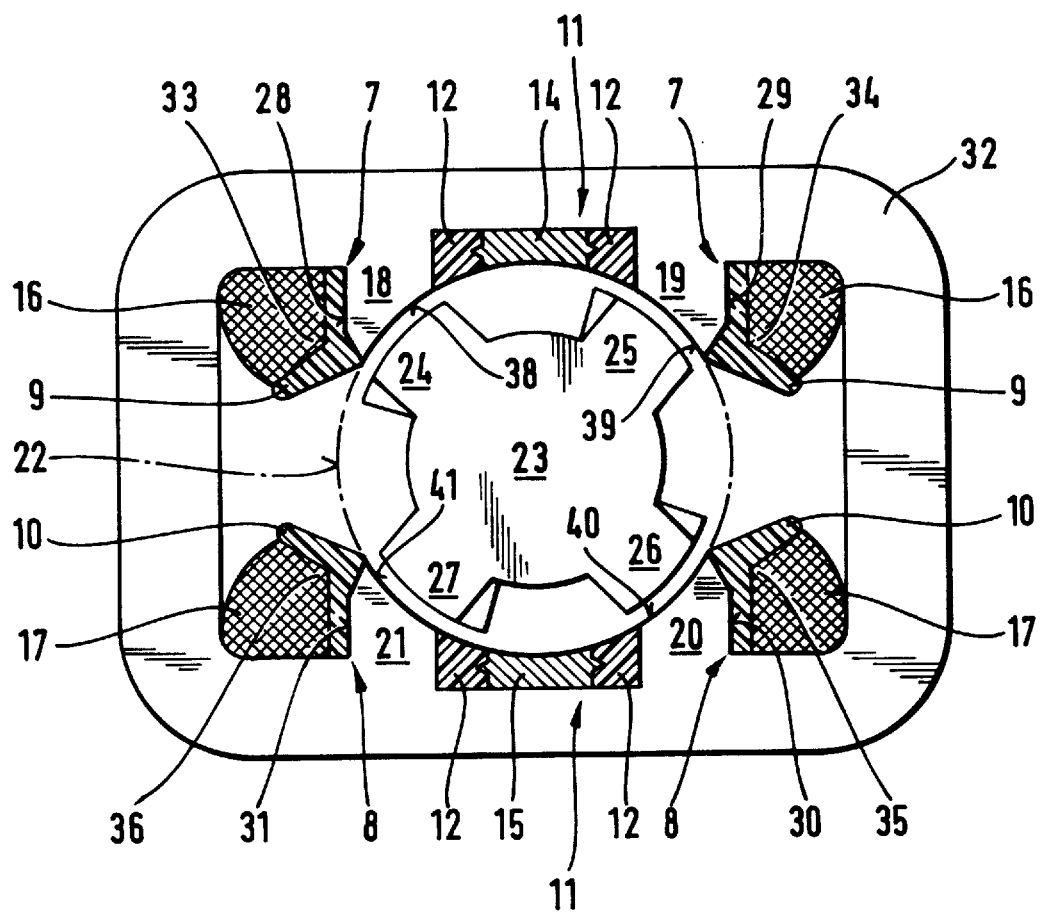
FIG. 1 shows a cross-sectional view of an electromotor according to the present invention.

FIG. 1 shows an electromotor according to the present invention in which a stator 32, which is formed of a lamination bundle, has a central receiving region into which stator poles 18, 19, 20, 21, arranged in pairs, project. Inside of the stator envelope 22, which is formed by contact surfaces 38, 38, 40, 41 of the stator poles 18, 19, 20, 21, a rotor 23 which four rotor poles 24, 25, 26, 27 is located.

Figure 2:
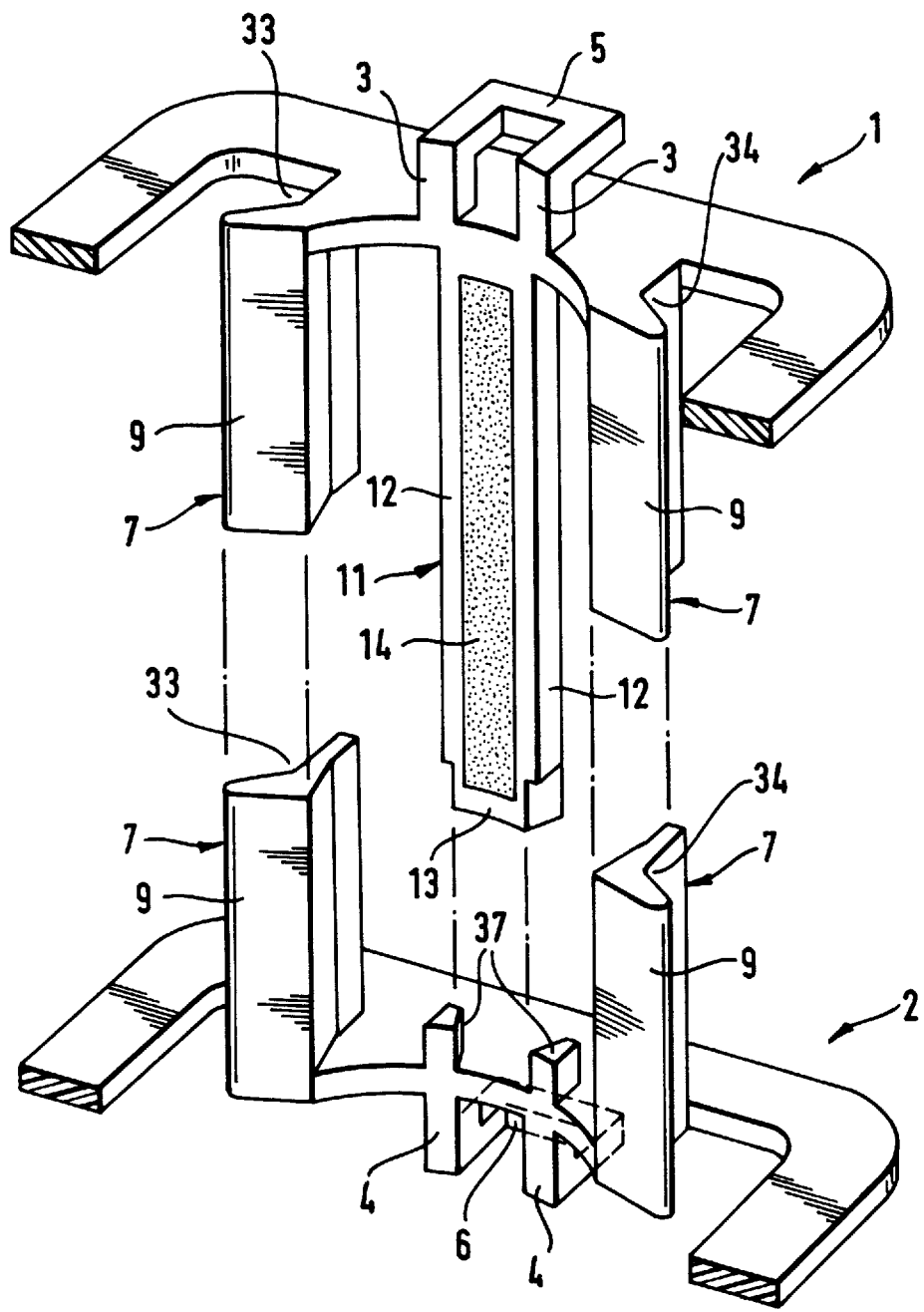
FIG. 2 shows an enlarged section of both insulation elements in the region of a stator pole pair (not shown), without the stator winding.

As shown in FIG. 2, at both end sides of the stator 32, there are provided respective insulation elements 1, 2 which have support elements 7, 8 projecting into the interior of the stator 32. The support elements 7, 8 extend over about half of the total length of the stator 32. When both insulation elements 1, 2 adjoin the end sides of the stator 32, the end sides cooperate with the free end regions of the support elements 7, 8.

The shape of the insulation elements 1, 2 substantially corresponds to the end side projection surface of the stator 32. At their side remote from the stator 32, the substantially ring-shaped insulation elements 1, 2 have tongues 5,6 spaced from the insulation element 1, 2 by webs 3, 4. The webs 3, 4 extend substantially parallel to the main axis of the rotor-receiving region of the stator 32 and are provided in the region of the envelope 22 which is formed by the stator poles 18,19, 20, 21. The tongues 5, 6 extend substantially parallel to the insulation elements 1, 2 radially outwardly.

A stator winding 16, 17 which is formed of a winding wire, surrounds a respective stator pole pair 18, 19, 20, 21 and the region of the respective insulation element 1, 2 covered by the respective tongue 5, 6. The dielectric support elements 7, 8, which are formed integrally with respective insulation elements 1, 2, are arranged between side surfaces 28, 29, 30, 31 of the stator poles 18, 19, 20, 21, which extend along the main axis of the rotor-receiving region of the stator 32 substantially parallel to each other, and the respective stator windings 17, 18. The support elements 7, 8 are formed of a non-magnetic and non-metallic material, e.g., of a plastic material.

In a direction perpendicular to the main or longitudinal axis of the stator 32, the support elements 7, 8 have widened regions 9, 10, respectively, which extend partially along the envelope 22 formed by the stator poles 18, 19, 20, 21. These widened region, 9, 10 provide concave receiving regions 33, 34, 35, 36 facing the longitudinal axis of the stator 32. The concave regions 33, 34, 35, 36 prevent the winding wire from sliding off side surfaces of the stator poles 28, 29, 30, 31 during mechanized placing of the winding wire into the stator 32.

On the insulation element 1 parallel to the support elements 7, carriers 11 are provided. FIG. 2 shows the insulation element 1 with only one carrier 11. Each carrier 11 serves for receiving one of permanent magnets 14, 15, and it projects perpendicular from the side of the insulation element 1 adjacent to the stator 32. The carrier 11 is formed of two, extending parallel to each other, dielectric carrier elements 12 which are connected with each other at their ends by a connection web 13. The carrier elements 12 extend between the side surfaces of the stator pole pairs 18, 19, 20, 21 and the permanent magnets 14, 15 along the entire length of the stator 32. Likewise, each permanent magnet 14, 15 extends along the entire length of the stator 32.

The insulation element 1, the carrier elements 12 forming the carrier 11, and the connection web 13 form together a receiving region the shape of which substantially corresponds to the outer contour of the permanent magnets 14, 15. The form-locking cooperation of the inner contour of the carrier elements 12 with the outer contour of the permanent magnet 14, 15 prevents the permanent magnet 14, 15 from falling out from the carrier elements 12.

The carrier elements 12, in the region of the connection web 13, become form-lockingly connected with the guide regions 37 of the second insulation element 2 when the insulation elements 1, 2 are mounted on the end surfaces of the stator 32.

The insulation elements 1, 2, the carrier 11, and the support elements 7, 8 are formed of a non-magnetic, non-metallic material e.g., of a plastic material.

Though the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. An electromotor, comprising:

a rotor (23);

a stator (32) having a central region for receiving the rotor (23), at least four stator poles (18, 19, 20, 21) arranged in pairs and projecting into the central rotor-receiving region, a stator winding (16, 17) surrounding each pair of stator poles (18, 19, 20, 21), and a permanent magnet (14, 15) arranged between each pair of the stator poles (18, 19, 20, 21);

two insulation elements (1, 2) provided on opposite end sides of the stator (32), respectively, the stator winding surrounding a portion of each insulation element; and a dielectric support element (7, 8) cooperating with at least one of the insulation elements (1, 2), the dielectric support element (7, 8) being arranged between respective side surfaces (28, 29; 30, 31) of a respective stator pole pair (18, 19; 20, 21) which extend substantially parallel to a main axis of the rotor-receiving region of the stator (32) and the stator winding (14, 15).

2. An electromotor according to claim 1, wherein the support elements (7, 8 ) at least partially extend along an envelope (22) formed by contact surfaces (38, 39, 40, 41) of the stator poles (18, 19, 20, 21).

3. An electromotor according to claim 1, wherein the support elements (7, 8) are formed integrally with one of the two insulation elements (1, 2).

4. An electromotor according to claim 1, wherein the support elements (7, 8) are formed of a plastic material.

5. An electromotor, comprising a rotor (23); a stator (32) having a central region for receiving the rotor, at least four stator poles (18, 19, 20, 21) arranged in pairs and projecting into th central rotor-receiving region, a stator winding (16, 17) surrounding each pair of stator poles, and a permanent magnet (14, 15) arranged between each pair of stator poles (18, 19, 20, 21); an insulation element (1, 2) provided on each end side of the stator (32), the stator winding surrounding a portion of a respective insulation element (1, 2); and a dielectric support element (7, 8) cooperating with at least one of the insulation elements (1, 2) and arranged between respective side surfaces (28, 29, 30, 31) of stator pole pairs (18, 19, 20, 21), which extend substantially parallel to a main axis of the rotor-receiving region of the stator (32) and to each other, and the stator winding (16, 17), respectively, wherein one of the insulation elements (1, 2) has at least two carriers (11) projecting therefrom for receiving the two permanent magnets (14, 15), respectively.

6. An electromotor according to claim 5, wherein each carrier (11) is formed of two parallel dielectric carrier elements (12) arranged between the side surfaces (28, 29, 30, 31) of respective stator pole pair (18, 19, 20, 21) and the permanent magnet (14, 15).

7. An electromotor according to claim 6, wherein the carrier elements (12) are formed of a plastic material.

* * * * *